US012654723B2

(12) United States Patent
Guvenc et al.

(10) Patent No.: US 12,654,723 B2
(45) Date of Patent: Jun. 16, 2026

(54) VEHICLE-IN-VIRTUAL-ENVIRONMENT (VVE) METHODS AND SYSTEMS FOR AUTONOMOUS DRIVING SYSTEM

(71) Applicant: Ohio State Innovation Foundation, Columbus, OH (US)

(72) Inventors: Levent Guvenc, Columbus, OH (US); Bilin Aksun-Guvenc, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 290 days.

(21) Appl. No.: 17/689,159

(22) Filed: Mar. 8, 2022

(65) Prior Publication Data

US 2022/0289217 A1 Sep. 15, 2022

Related U.S. Application Data

(60) Provisional application No. 63/159,093, filed on Mar. 10, 2021.

(51) Int. Cl.
| | |
|---|---|
| *B60W 60/00* | (2020.01) |
| *B60W 50/04* | (2006.01) |
| *G06F 9/455* | (2018.01) |
| *G07C 5/02* | (2006.01) |

(52) U.S. Cl.
CPC ........ *B60W 50/04* (2013.01); *B60W 60/0015* (2020.02); *B60W 60/0027* (2020.02); *G06F 9/45504* (2013.01); *G07C 5/02* (2013.01)

(58) Field of Classification Search
None
See application file for complete search history.

(56) References Cited

U.S. PATENT DOCUMENTS

| | | | | |
|---|---|---|---|---|
| 9,612,123 | B1 * | 4/2017 | Levinson | B60Q 1/508 |
| 10,169,680 | B1 * | 1/2019 | Sachdeva | G06V 10/7788 |
| 10,599,546 | B1 * | 3/2020 | Walther | G06F 11/3013 |
| 10,625,748 | B1 * | 4/2020 | Dong | B60W 60/00272 |
| 10,678,253 | B2 * | 6/2020 | Zeng | B60W 50/14 |
| 10,824,913 | B1 * | 11/2020 | Genc | G05D 1/0221 |
| 11,042,156 | B2 * | 6/2021 | Chen | G05D 1/024 |
| 11,360,476 | B1 * | 6/2022 | Greve | G05D 1/0088 |
| 11,364,927 | B2 * | 6/2022 | Wolff | B60W 50/085 |
| 11,436,441 | B2 * | 9/2022 | Tan | G06V 10/776 |
| 11,454,978 | B2 * | 9/2022 | Silander | G01C 21/206 |
| 12,077,183 | B2 * | 9/2024 | Kothbauer | B60W 60/0011 |
| 12,291,240 | B1 * | 5/2025 | Morales Morales | G06F 11/3684 |
| 2016/0210382 | A1 * | 7/2016 | Alaniz | G09B 9/048 |
| 2017/0192423 | A1 * | 7/2017 | Rust | G05D 1/0212 |
| 2019/0179305 | A1 * | 6/2019 | Magzimof | B60W 30/00 |
| 2019/0302761 | A1 * | 10/2019 | Huang | G02B 27/017 |
| 2020/0065443 | A1 * | 2/2020 | Liu | G06Q 40/08 |

(Continued)

*Primary Examiner* — Jonathan M Dager

(74) *Attorney, Agent, or Firm* — Meunier Carlin & Curfman LLC

(57) ABSTRACT

The Vehicle-in-Virtual-Environment (VVE) technology described herein is directed to the use of a computational system and software that generates a highly realistic real world or representative 3D environment, generates raw perception and localization and communication sensor information from that environment, and feeds these to the autonomous driving computer system in an autonomous vehicle (AV) such that the autonomous driving system behaves as if it is in that environment.

16 Claims, 5 Drawing Sheets

(56)                    References Cited

U.S. PATENT DOCUMENTS

| | | | | |
|---|---|---|---|---|
| 2020/0074266 | A1* | 3/2020 | Peake | G06F 18/2411 |
| 2020/0097004 | A1* | 3/2020 | Whittaker | G06N 5/022 |
| 2020/0209858 | A1* | 7/2020 | Trofymov | G06N 20/00 |
| 2020/0353943 | A1* | 11/2020 | Siddiqui | G06T 7/20 |
| 2021/0124350 | A1* | 4/2021 | Kirigan | G06V 20/56 |
| 2021/0166477 | A1* | 6/2021 | Bunkasem | G06V 10/774 |
| 2021/0182620 | A1* | 6/2021 | Tan | G06F 18/217 |
| 2021/0294944 | A1* | 9/2021 | Nassar | G05D 1/0088 |
| 2021/0302270 | A1* | 9/2021 | Seetharaman | G07C 5/0808 |
| 2021/0383209 | A1* | 12/2021 | Brahma | G06V 10/82 |
| 2021/0387643 | A1* | 12/2021 | Hari | B60W 30/095 |
| 2021/0403036 | A1* | 12/2021 | Danna | G01C 21/3407 |
| 2021/0406262 | A1* | 12/2021 | Unnikrishnan | G06F 16/2462 |
| 2022/0055641 | A1* | 2/2022 | Wolff | G06N 3/08 |
| 2022/0073097 | A1* | 3/2022 | Sucan | G05D 1/0016 |
| 2022/0097736 | A1* | 3/2022 | Lin | B60W 60/0015 |
| 2022/0147743 | A1* | 5/2022 | Roy | G06N 3/0464 |
| 2022/0164602 | A1* | 5/2022 | Frtunikj | G06V 10/774 |
| 2023/0053687 | A1* | 2/2023 | Worman | G01M 17/007 |
| 2023/0065339 | A1* | 3/2023 | Sahawneh | G08G 1/0133 |
| 2023/0110713 | A1* | 4/2023 | Degirmenci | G06N 3/0442 |
| | | | | 701/24 |
| 2023/0202507 | A1* | 6/2023 | Chu | G06V 20/20 |
| | | | | 701/23 |
| 2023/0222267 | A1* | 7/2023 | Muehlenstaedt | G06F 18/217 |
| | | | | 703/8 |
| 2023/0222268 | A1* | 7/2023 | Muehlenstaedt | G05D 1/0217 |
| | | | | 703/1 |
| 2023/0222332 | A1* | 7/2023 | Mahendran | G06N 3/045 |
| | | | | 706/25 |
| 2023/0294736 | A1* | 9/2023 | Lu | G01S 17/006 |
| | | | | 701/23 |
| 2023/0359780 | A1* | 11/2023 | Bouillon | G06N 20/00 |
| 2024/0095418 | A1* | 3/2024 | Lopatine | G09B 9/05 |
| 2024/0160806 | A1* | 5/2024 | Friedrich | G06F 11/3698 |
| 2024/0232476 | A1* | 7/2024 | Govardhanam | G06F 30/15 |
| 2024/0295877 | A1* | 9/2024 | Vora | G01C 21/3446 |

* cited by examiner

100

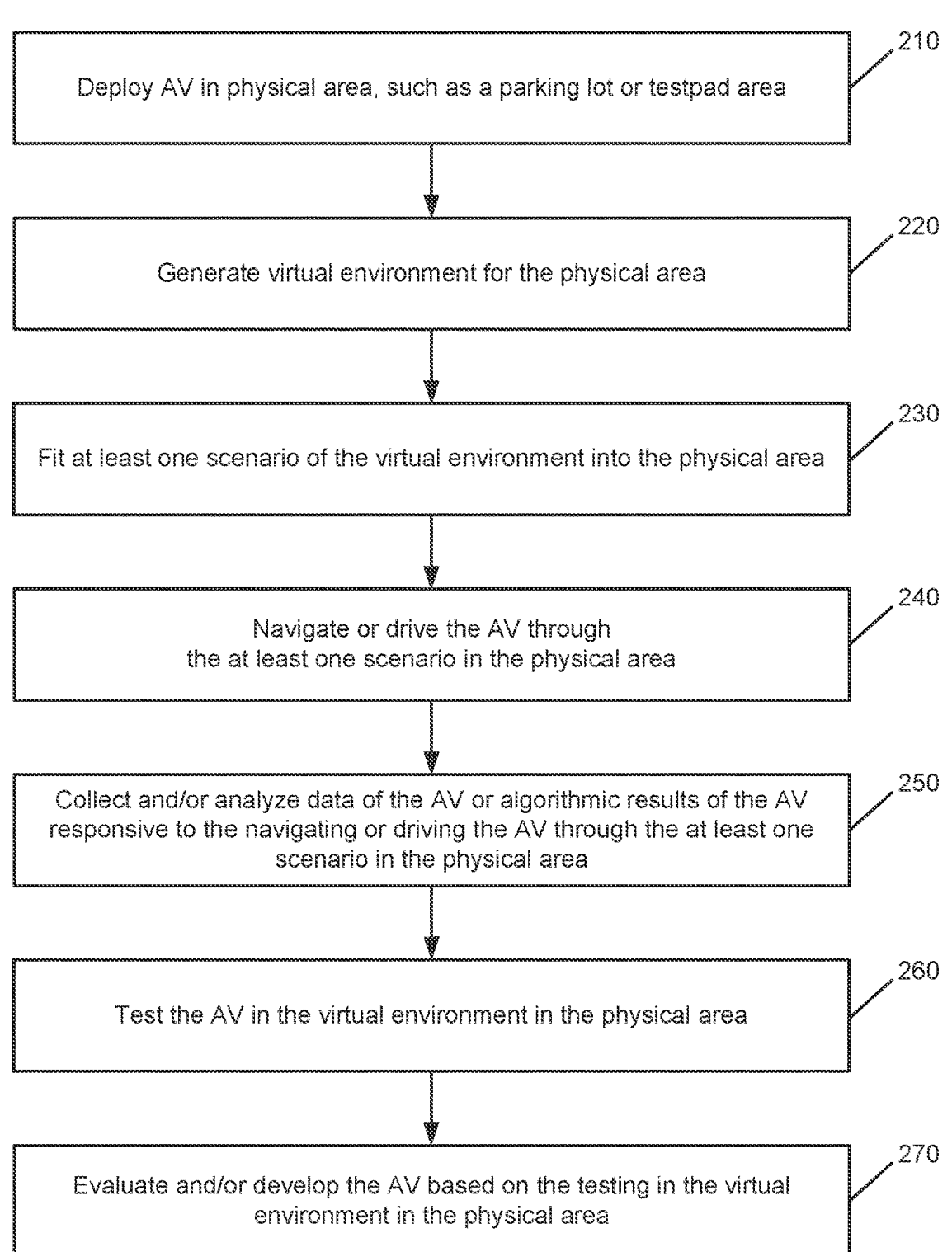

The following reproduces the flowchart content:

210 — Deploy AV in physical area, such as a parking lot or testpad area

220 — Generate virtual environment for the physical area

230 — Fit at least one scenario of the virtual environment into the physical area 240 — Navigate or drive the AV through the at least one scenario in the physical area 250 — Collect and/or analyze data of the AV or algorithmic results of the AV responsive to the navigating or driving the AV through the at least one scenario in the physical area 260 — Test the AV in the virtual environment in the physical area 270 — Evaluate and/or develop the AV based on the testing in the virtual environment in the physical area

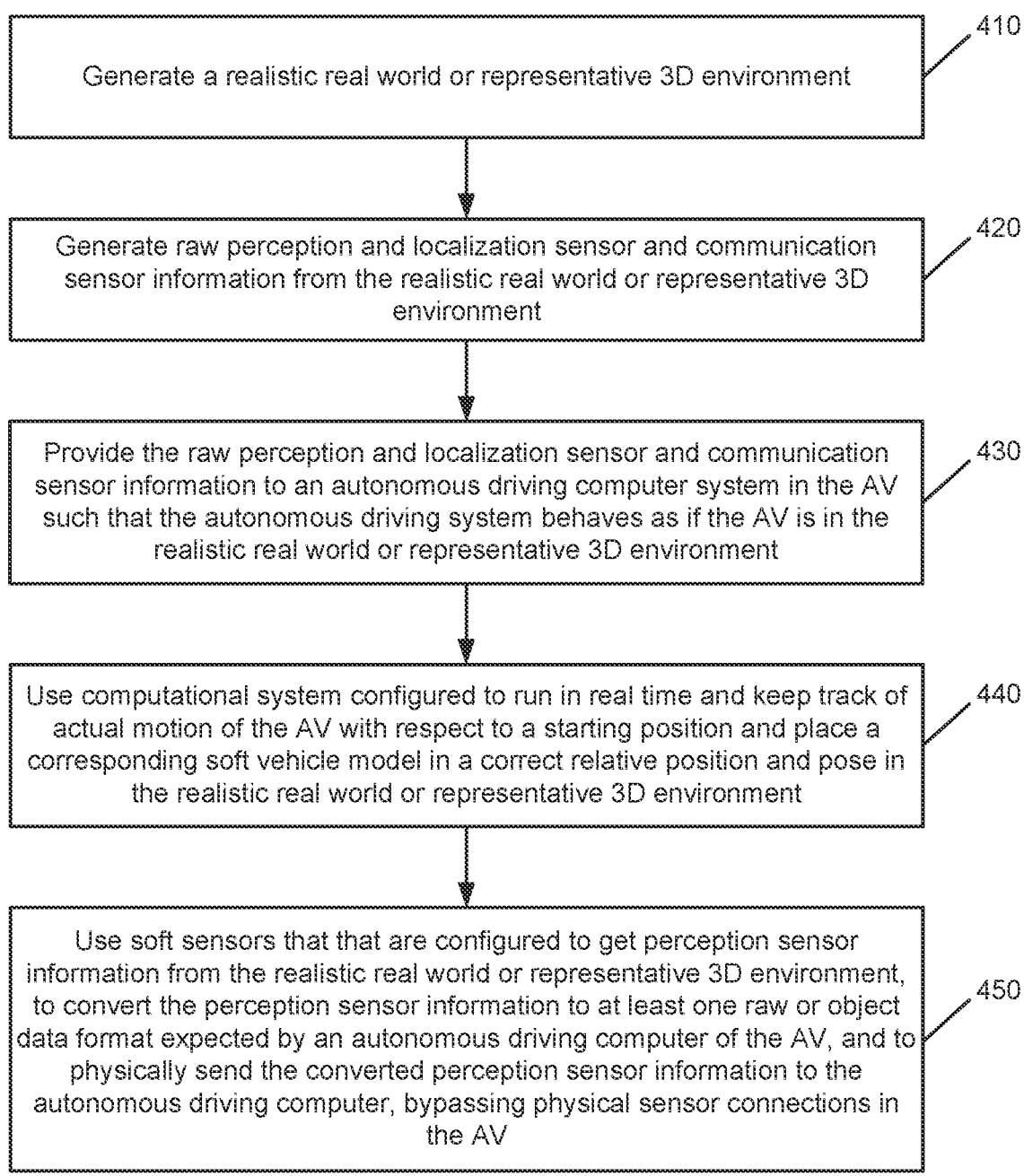

Generate a realistic real world or representative 3D environment    410

Generate raw perception and localization sensor and communication sensor information from the realistic real world or representative 3D environment    420

Provide the raw perception and localization sensor and communication sensor information to an autonomous driving computer system in the AV such that the autonomous driving system behaves as if the AV is in the realistic real world or representative 3D environment    430

Use computational system configured to run in real time and keep track of actual motion of the AV with respect to a starting position and place a corresponding soft vehicle model in a correct relative position and pose in the realistic real world or representative 3D environment    440

Use soft sensors that that are configured to get perception sensor information from the realistic real world or representative 3D environment, to convert the perception sensor information to at least one raw or object data format expected by an autonomous driving computer of the AV, and to physically send the converted perception sensor information to the autonomous driving computer, bypassing physical sensor connections in the AV    450

VEHICLE-IN-VIRTUAL-ENVIRONMENT (VVE) METHODS AND SYSTEMS FOR AUTONOMOUS DRIVING SYSTEM

CROSS-REFERENCE TO RELATED APPLICATIONS

This application claims the benefit of U.S. provisional patent application No. 63/159,093, filed on Mar. 10, 2021, and entitled "VEHICLE-IN-VIRTUAL-ENVIRONMENT (VVE) METHOD FOR AUTONOMOUS DRIVING SYSTEM DEVELOPMENT, EVALUATION AND DEMONSTRATION," the disclosure of which is expressly incorporated herein by reference in its entirety.

BACKGROUND

The development of autonomous road vehicle driving functions relies heavily on pure simulation in the form of model-in-the-loop (MIL), hardware-in-the-loop (HIL), and vehicle-in-the-loop (VIL) forms. More particularly, the automotive control, advanced driver-assistance systems (ADAS), and autonomous vehicle (AV) driving preliminary testing and initial development work have been relying heavily on MIL (pure simulation). HIL (some hardware like electronic control units or sensors like camera/radar are physically in the real time simulation loop), and VIL (actual vehicle on a dynamometer is within the simulation loop and sometimes able to steer along with brake/throttle responding to a soft simulation of the environment or to robot vehicles in relative motion to it with the test vehicle being stationary). The dynamic vehicle motion, its dynamic effect on sensor readings, its interactions with the vehicle controls are either simulated or emulated in this approach, resulting in lower fidelity and less accurate results than what takes place in actual road use.

Most of the subsequent development and evaluation of autonomous vehicles is unfortunately taking place on public roads after brief closed track or proving ground testing. Proving ground testing is not able to offer full testing of AVs because environment sensing which is very important for AVs cannot be replicated in a traditional proving ground. Testing and development on public roads is not a safe operation and requires very long miles of driving to capture rare, extreme events that are important for AV function development.

An exception is the creation of city blocks (either real buildings or faces of real buildings being replicated). These are very useful but also very limited as the urban setting is fixed and cannot be changed easily. It is also almost impossible to generate all the possible test cases of interest in a safe manner.

Demonstration of an AV deployment at the planning stage is always done on the planned deployment site like an actual deployment which makes early demonstrations of planned deployments and initial user acceptance studies very costly and time consuming.

Training of AV operators (hosts who are in the vehicle or remote operators also called phantom drivers) in current deployments is either done in a garage, lab, or similar static setting which is not realistic or on public roads which is not safe.

It is with respect to these and other considerations that the various aspects and embodiments of the present disclosure are presented.

SUMMARY

Systems and methods are provided for a Vehicle-in-Virtual-Environment (VVE) approach as one or more hardware products and/or software products. The products are used for safe, reliable, repetitive, scalable testing and evaluation of AV driving algorithms where almost any real life scenario or possible failure can easily be injected into the system in a safe and controlled environment. This VVE evaluation and development also lowers the cost and accident risk of AV system development and testing and will be useful for developers of AVs, training of in-vehicle and remote AV operators, for legislators/authorities that evaluate the safety of those systems before they are allowed on public roads and for companies that want to demonstrate AV driving in a planned site to potential customers.

In an implementation, a system comprises an autonomous vehicle (AV) and a computing device configured to generate a virtual environment, wherein the AV is configured to operate and be tested in the virtual environment.

In an implementation, a method comprises: deploying an AV in a physical area; generating a virtual environment for the physical area; fitting at least one scenario of the virtual environment into the physical area; and navigating or driving the AV through the at least one scenario in the physical area.

In an implementation, a system comprises a computational system and software that are configured to: generate a realistic real world or representative three-dimensional (3D) environment; generate raw perception and localization sensor information from the realistic real world or representative 3D environment, and feed the raw perception and localization sensor information to an autonomous driving computer system in an AV such that the autonomous driving system behaves as if the AV is in a realistic real world or representative 3D environment.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 2 is an operational flow of an implementation of a VVE method for an autonomous driving system;

FIG. 4 is an operational flow of another implementation of a VVE method for an autonomous driving system.

DETAILED DESCRIPTION

Figure 1:
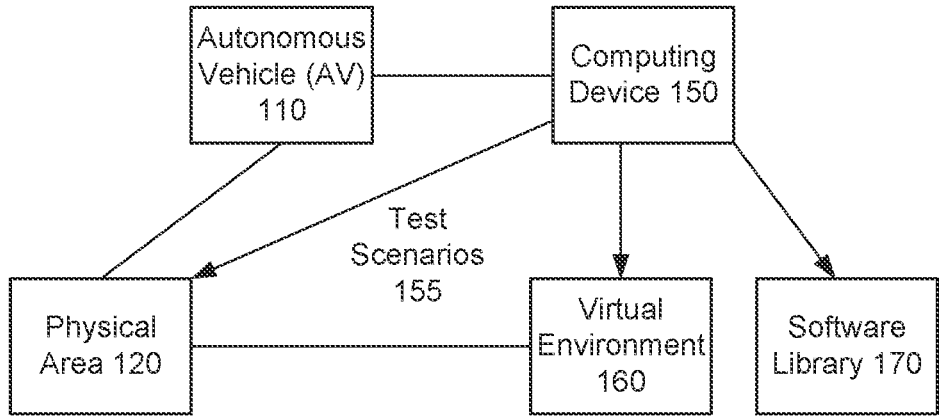
FIG. 1 is a diagram of an implementation of a vehicle-in-virtual environment (VVE) system for an autonomous driving system.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Aspects, features, and implementations of the Vehicle-in-Virtual-Environment (VVE) technology described herein are directed to the use of a computational system and software that generates a highly realistic real world or representative 3D environment, generates raw perception and localization sensor information from that environment, and feeds these to the autonomous driving computer system in an autonomous vehicle (AV) such that the autonomous driving system behaves as if it is in that environment. The highly realistic environment model is created beforehand using a game engine (such as Unreal or Unity, for example) for highly realistic rendering and is built using an existing map (such as OpenStreetMap or similar, for example) and images of that environment (such as those in Google etc., for example).

FIG. 1 is a diagram of an implementation of a VVE system 100 for an autonomous driving system. The VVE system comprises an AV 110 and a computing device 150 configured to generate a virtual environment 160. The AV 110 is configured to operate and be tested in the virtual environment 160. The system further comprises a software library 170 that is configured to emulate a plurality of virtual environments including the virtual environment 160 generated by the computing device 150.

Figure 5:
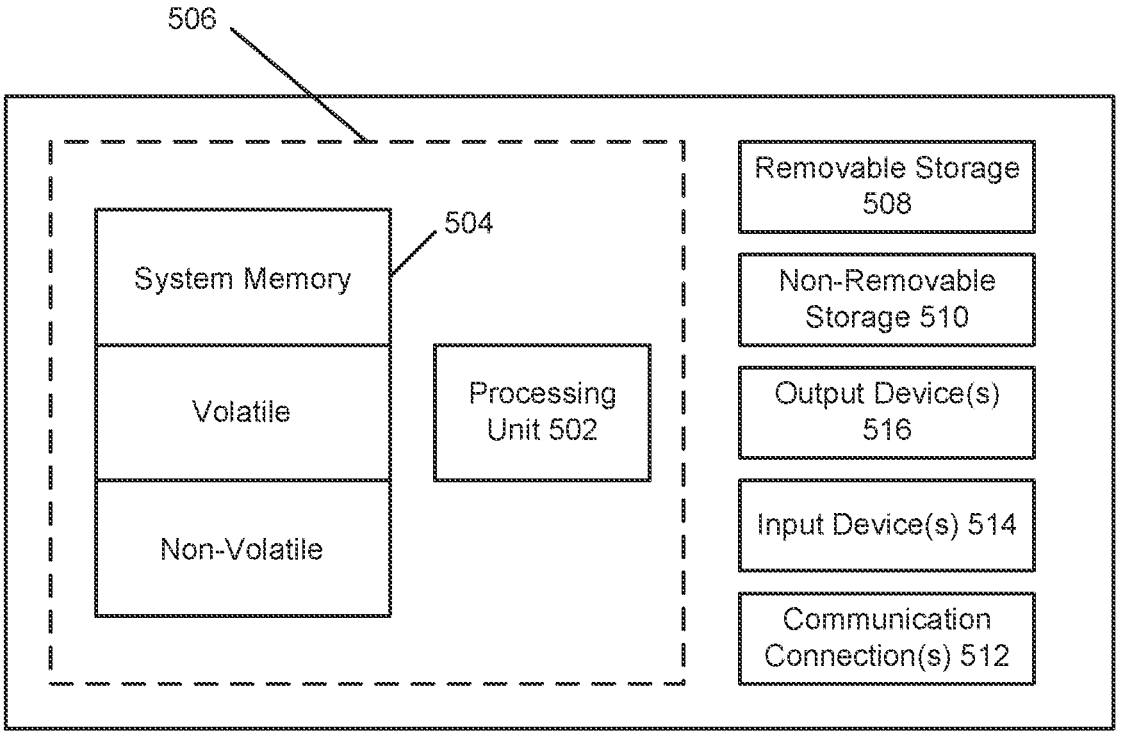
FIG. 5 shows an exemplary computing environment in which example embodiments and aspects may be implemented.

The computing device 150 may be implemented using a variety of computing devices such as desktop computers, laptop computers, tablets, etc. Other types of computing devices may be supported. A suitable computing device is illustrated in FIG. 5 as the computing device 500.

In some implementations, at least one scenario of the virtual environment 160 is fit into a physical area 120 in which the AV 110 is physically present. For example, the physical area 120 is a parking lot or a testpad area.

In some implementations, the computing device 150 is configured to run a plurality of test scenarios 155 for the AV 110 to physically navigate or drive through in the virtual environment 160, for an evaluation or a development of the AV 110.

In some implementations, a plurality of algorithms of the AV 110 are tested in the virtual environment 160. For example, the plurality of algorithms may comprise perception and object detection algorithms of the AV 110.

Depending on the implementation, the virtual environment 160 has different test scenarios including other road users (e.g., other vehicles, motorcyclists, bicyclists, scooters, pedestrians, low lying objects, etc.), infrastructure (e.g., stop signs, roundabouts, traffic circles, signalized intersections, etc.), weather effects, road irregularities, irregularly parked obstacles (e.g., cars, trashcans, etc.), deep billboard effects, suddenly appearing obstacles, false positives (on some sensors), false negatives (on some sensors), weather effects on sensor outputs and other sensor falsification effects. A main AV evaluation scenario is prepared before the test but it is also possible to inject some faults on the fly during the actual testing using an interface to the computational system.

FIG. 2 is an operational flow of an implementation of a VVE method 200 for an autonomous driving system.

At 210, an AV, such as the AV 110, is deployed in a physical area. In some implementations, the physical area is a parking lot or a testpad area.

At 220, a virtual environment is generated for the physical area.

At 230, at least one scenario of the virtual environment is fit into the physical area.

At 240, the AV is navigated or driven through the at least one scenario in the physical area.

At 250, data of the AV or algorithmic results of the AV responsive to the navigating or driving the AV through the at least one scenario in the physical area are collected and/or analyzed.

At 260, the AV is tested in the virtual environment in the physical area. Testing the AV comprises testing a plurality of algorithms of the AV in the virtual environment in the physical area. The plurality of algorithms comprises perception and object detection algorithms of the AV.

At 270, the AV is evaluated and/or developed based on the testing in the virtual environment in the physical area.

Figure 3:
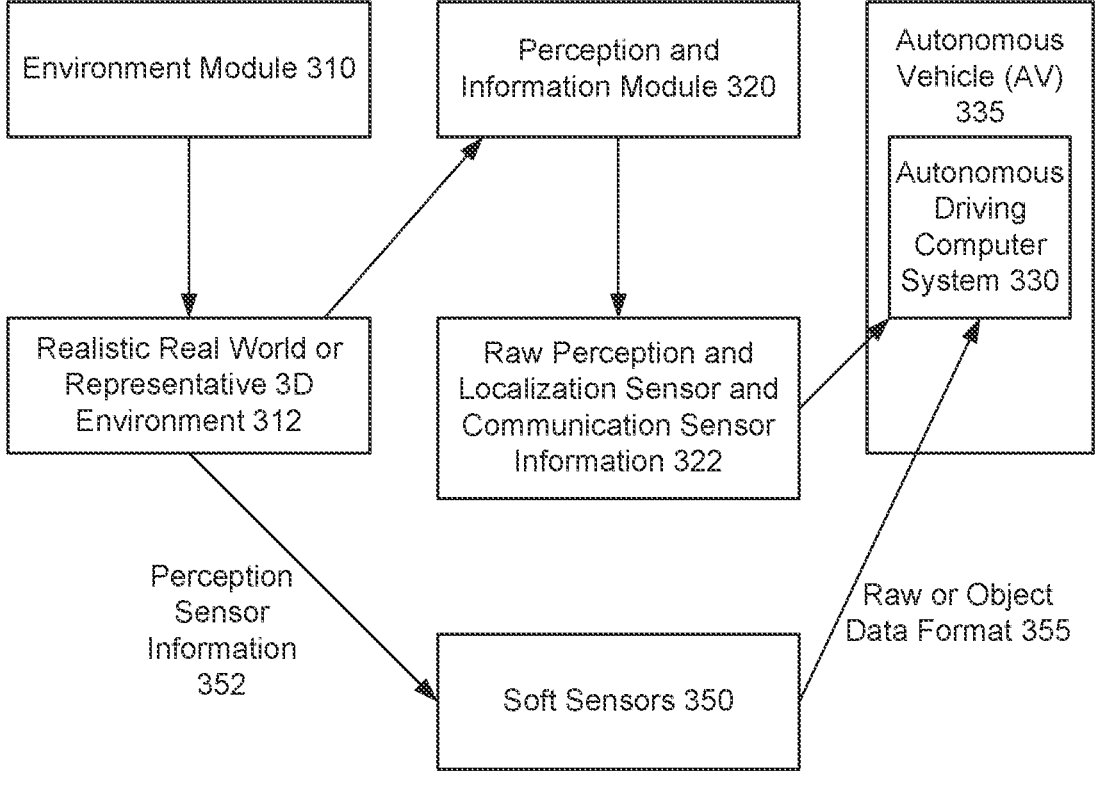
FIG. 3 is a diagram of another implementation of a VVE system for an autonomous driving system.

FIG. 3 is a diagram of an implementation of a VVE system 300 for an autonomous driving system. The system 300 comprises an environment module 310 that is configured to generate a realistic real world or representative 3D environment 312. The system 300 also comprises a perception and information module 320 that is configured to generate raw perception and localization sensor and communication sensor information 322 from the realistic real world or representative 3D environment 312. The system 300 also comprises an autonomous driving computer system 330 in an AV 335. The autonomous driving computer system 330 receives the raw perception and localization sensor and communication sensor information 322 such that the autonomous driving system behaves as if the AV 335 is in a realistic real world or representative 3D environment.

The autonomous driving computer system 330 may be implemented using a variety of computing devices such as desktop computers, laptop computers, tablets, etc. Other types of computing devices may be supported. A suitable computing device is illustrated in FIG. 5 as the computing device 500.

In an implementation, the system 300 is configured to run in real time and keep track of actual motion of the AV 335 with respect to a starting position and place a corresponding soft vehicle model in a correct relative position and pose in the realistic real world or representative 3D environment 312.

In an implementation, the system 300 further comprises a plurality of soft sensors 350 configured to obtain perception sensor information 352 from the realistic real world or representative 3D environment 312, convert the perception sensor information 352 to at least one raw or object data format 355 expected by an autonomous driving computer system 330 of the AV 335, and physically send the converted perception sensor information to the autonomous driving computer system 330, bypassing physical sensor connections in the AV 335.

The computational system runs in real time and keeps track of the actual motion of the vehicle with respect to the starting (home) position which it uses to place the corresponding soft vehicle model in the correct relative position and pose in the virtual 3D environment. Soft sensors (sensor models) are used to get perception sensor information (e.g., RGB camera, depth camera, 3D lidar, lidar, radar, communication sensor including DSRC, C-V2X, Bluetooth, 5G, 6G, smartphone, etc.) from the 3D environment, convert them to raw or object data format(s) expected by the AV's autonomous driving computer and physically send them to that computer, bypassing the physical sensor connections in the AV. In this manner, the AV is immersed in a virtual reality setting.

VVE testing/evaluation is executed in a large, flat, and empty area (like a large parking lot or testpad area), in some implementations. The starting point of the VVE testing is marked as the home position. Large virtual environments that do not fit the physical test area are broken down into parts that fit. These parts are then connected using extraneous bends/turns to turn the vehicle around as it reaches the physical area limits while switching from one virtual environment part to the other. Large virtual environments can easily be tested using this method.

In some implementations, AV sensor data is extracted from these environments and sent to an AV computer where AV driving functions reside. An in-vehicle product comprises a high performance GPU/CPU in-vehicle computer that runs the virtual environment simulation in real time and sends AV sensor data to the AV driving computer while the vehicle is operating inside the large empty test area. A connection box may be used to ease the connection of the simulated sensor data signals to the tested vehicle's autonomous driving system while bypassing the actual sensor connections when used as a development system. In this manner, the developer can switch easily from VVE testing to actual road testing and vice versa. VR goggles may be used in some implementations especially for demonstration applications, along with software mapping of the virtual world into various test area dimensions.

FIG. 4 is an operational flow of an implementation of a VVE method 400 for an autonomous driving system.

At 410, a realistic real world or representative 3D environment is generated.

At 420, raw perception and localization sensor and communication sensor information from the realistic real world or representative 3D environment is generated.

At 430, the raw perception and localization sensor and communication sensor information is provided to an autonomous driving computer system in the AV such that the autonomous driving system behaves as if the AV is in the realistic real world or representative 3D environment.

At 440, a computational system is used that is configured to run in real time and keep track of actual motion of the AV with respect to a starting position and place a corresponding soft vehicle model in a correct relative position and pose in the realistic real world or representative 3D environment.

In some implementations, at 450, soft sensors are used that are configured to get perception sensor information from the realistic real world or representative 3D environment, to convert the perception sensor information to at least one raw or object data format expected by an autonomous driving computer of the AV, and to physically send the converted perception sensor information to the autonomous driving computer, bypassing physical sensor connections in the AV.

The systems and methods provided herein are particularly suitable for use in urban area AV driving evaluation and development. During the testing, there is a safety driver who is able to manually stop the vehicle and take over control at any time. Other people can also be present in the vehicle. Those other people may also wear 3D virtual reality headgear through which they also are immersed in the same virtual environment as the AV under test/development.

The VVE approach described herein, and its various features and implementations, provide the future of safe, reliable, repetitive, scalable testing and evaluation of AV driving algorithms where almost any real life scenario or possible failure can easily be injected into the system. The VVE evaluation and development provided herein also lowers the cost and accident risk of AV system development and testing. The systems and methods herein are useful for both developers of AVs and legislators/authorities that evaluate the safety of those systems before they are allowed on public roads.

Thus, the systems and methods described herein allow a real AV to be tested on a real road with a programmable virtual environment. This is superior to other approaches because it is much safer as compared to public road testing, because the testing scenario combinations that can be used is endless as compared to a very limited scope testing in a proving ground even with a replica of building blocks, and because it has much higher fidelity and therefore higher usefulness as compared to MIL or HIL testing because the actuators and dynamics of the vehicle motion are in the loop during testing with the proposed method.

The methods and systems described herein can also be used to demonstrate planned AV deployment without the need to physically deploy at the planned site. As such it will be useful for both companies that plan to deploy AVs and also for communities that are interested in safely evaluating or visualizing a planned AV deployment within their boundaries.

The implementations can also be used to train in-vehicle and remote AV operators.

The implementations can also be used to test AV and operator control authority transition when the AV functions are not able to continue autonomous driving in the immersed virtual reality situation. The operator will be wearing a VR headset in this case and there will be a second test operator in the vehicle.

The implementations can also be used to test and develop cooperative driving of multiple vehicles. The real vehicle can be placed in any location in a convoy of vehicles or within a group of cooperating vehicles. The other vehicles will be soft vehicles in the immersed virtual reality environment. In cooperative driving, the implementations can be used to test the sharing of cooperative perception information between the vehicles.

The implementations can be used to add other road actors like other vehicles, pedestrians etc. into the testing and development. The other road users will be immersed in the same virtual environment as the test vehicle and at their corresponding locations. If needed, safer multiple real road actor operation will be achieved by using a different and independent driving area for each road actor with the VR headsets being used to place all of them in the same virtual environment. Other road actor position information will be obtained using communication between vehicles (e.g., pedestrians, etc.). This approach makes the interactions between vehicles and between vehicles and pedestrians (and other vulnerable road users) safe and realistic.

The implementations can also be used to re-create and analyze AV accidents especially those involving AV fault. The simulated virtual reality environment will be programmed to re-create the pre-accident scene and flow of events until the crash incident in this application of the implementations with the simulated pre-accident raw sensor data being fed into the same type of AV involved in the accident. This accident re-construction will generate realistic data that can be used to determine accident cause and do fault analysis in a much faster manner as compared to existing approaches for accident re-construction.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

In an implementation, a system comprises: an autonomous vehicle (AV); and a computing device configured to generate a virtual environment, wherein the AV is configured to operate and be tested in the virtual environment.

Implementations may include some or all of the following features. The system further comprises a software library that is configured to emulate a plurality of virtual environments including the virtual environment generated by the computing device. At least one scenario of the virtual environment is fit into a physical area in which the AV is physically present. The physical area is a parking lot or a testpad area. The computing device is further configured to run a plurality of test scenarios for the AV to physically navigate or drive through in the virtual environment, for an evaluation or a development of the AV. A plurality of algorithms of the AV are tested in the virtual environment. The plurality of algorithms comprises localization and perception and object detection and decision making and path tracking and collision avoidance and similar algorithms of the AV.

In an implementation, a method comprises: deploying an autonomous vehicle (AV) in a physical area; generating a virtual environment for the physical area; fitting at least one scenario of the virtual environment into the physical area; and navigating or driving the AV through the at least one scenario in the physical area.

Implementations may include some or all of the following features. The physical area is a parking lot or a testpad area. The method further comprises testing the AV in the virtual environment in the physical area. Testing the AV comprises testing a plurality of algorithms of the AV in the virtual environment in the physical area. The plurality of algorithms comprises localization and perception and object detection and decision making and path tracking and collision avoidance and similar algorithms of the AV. The method further comprises evaluating or developing the AV based on the testing in the virtual environment in the physical area. The method further comprises collecting or analyzing data of the AV or algorithmic results of the AV responsive to the navigating or driving the AV through the at least one scenario in the physical area. The method further comprises generating a realistic real world or representative three-dimensional (3D) environment; generating raw perception and localization sensor and communication sensor information from the realistic real world or representative 3D environment; and feeding the raw perception and localization sensor and communication sensor information to an autonomous driving computer system in the AV such that the autonomous driving system behaves as if the AV is in the realistic real world or representative 3D environment. The method further comprises using a computational system configured to run in real time and keep track of actual motion of the AV with respect to a starting position and place a corresponding soft vehicle model in a correct relative position and pose in the realistic real world or representative 3D environment. The method further comprises using soft sensors configured to get perception sensor information from the realistic real world or representative 3D environment, convert the perception sensor information to at least one raw or object data format expected by an autonomous driving computer of the AV, and physically send the converted perception sensor information to the autonomous driving computer, bypassing physical sensor connections in the AV.

In an implementation, a system comprises a computational system and software that are configured to: generate a realistic real world or representative three-dimensional (3D) environment; generate raw perception and localization sensor information from the realistic real world or representative 3D environment; and feed the raw perception and localization and communication sensor information to an autonomous driving computer system in an autonomous vehicle (AV) such that the autonomous driving system behaves as if the AV is in a realistic real world or representative 3D environment.

Implementations may include some or all of the following features. A system comprises a computational system and software that are configured to: generate a realistic real world or representative three-dimensional (3D) environment; generate raw perception and localization and communication sensor information from the realistic real world or representative 3D environment; and feed the raw perception and localization and communication sensor information to an autonomous driving computer system in an autonomous vehicle (AV) such that the autonomous driving system behaves as if the AV is in a realistic real world or representative 3D environment. The computational system is configured to run in real time and keep track of actual motion of the AV with respect to a starting position and place a corresponding soft vehicle model in a correct relative position and pose in the realistic real world or representative 3D environment. The system further comprises a plurality of soft sensors configured to obtain perception sensor information from the realistic real world or representative 3D environment, convert the perception sensor information to at least one raw or object data format expected by an autonomous driving computer of the AV, and physically send the converted perception sensor information to the autonomous driving computer, bypassing physical sensor connections in the AV.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
an autonomous vehicle (AV) deployed in a physical area;
a computing device configured to generate a virtual environment that is a realistic real world or representative three-dimensional (3D) environment, the computing device tracking actual motion of the AV with respect to a starting position and place a corresponding soft vehicle model in a correct relative position and pose in the realistic real world or 3D environment;
a plurality of soft sensors that obtain perception sensor information from the realistic real world or representative 3D environment, convert the perception sensor information to at least one raw or object data format expected by an autonomous driving computer system of the AV, and physically send the converted perception sensor information to the autonomous driving computer system while bypassing physical sensor connections in the AV;
the computing device further configured to:
fit at least one scenario of the virtual environment into the physical area in which the AV is deployed including breaking down the virtual environment into parts that fit into the physical area and connecting the parts using extraneous bends or turns;
generate raw perception and localization sensor information from the realistic real world or representative 3D environment;
feed the raw perception and localization sensor information to an autonomous driving computer system in the AV such that the autonomous driving system navigates AV within the physical area; and
navigate the AV in the physical area from within the virtual environment wherein testing is performed to determine capabilities of the AV.

2. The system of claim 1, further comprising a software library that is configured to emulate a plurality of virtual environments including the virtual environment generated by the computing device.

3. The system of claim 1, wherein the physical area is a parking lot or a testpad area.

4. The system of claim 1, wherein the computing device is further configured to run a plurality of test scenarios for the AV to physically navigate or drive through in the virtual environment, for an evaluation or a development of the AV.

5. The system of claim 1, wherein a plurality of algorithms of the AV are tested in the virtual environment.

6. The system of claim 5, wherein the plurality of algorithms comprises localization and perception and object detection and decision making and path tracking and collision avoidance algorithms of the AV.

7. A method comprising:
deploying an autonomous vehicle (AV) in a physical area;
generating a virtual environment for the physical area that is a realistic real world or representative three-dimensional (3D) environment;
fitting at least one scenario of the virtual environment into the physical area including breaking down virtual environments into parts that fit into the physical area and connecting the parts using extraneous bends or turns;
generating raw perception and localization sensor information from the realistic real world or representative 3D environment using soft sensors configured to obtain perception sensor information from the realistic real world or representative 3D environment, convert the perception sensor information to at least one raw or object data format expected by an autonomous driving computer of the AV, and physically send the converted perception sensor information to the autonomous driving computer while bypassing physical sensor connections in the AV;

feeding the raw perception and localization sensor information to an autonomous driving computer system in the AV such that the autonomous driving system navigates AV within the physical area while a computational system runs in real time and keeps track of actual motion of the AV with respect to a starting position and places a corresponding soft vehicle model in a correct relative position and pose in the realistic real world or representative 3D environment; and navigating the AV through in the physical area from within the virtual environment to test capabilities of the AV under the at least one scenario.

8. The method of claim 7, wherein the physical area is a parking lot or a testpad area.

9. The method of claim 7, further comprising testing the AV in the virtual environment in the physical area by executing localization, perception, object detection, decision making, path tracking, and collision avoidance algorithms of the AV using soft-sensor-generated data while the AV physically traverses the physical area.

10. The method of claim 9, wherein testing the AV comprises operating the autonomous driving computer of the AV using the raw perception and localization information generated by the soft sensors while the AV physically traverses the physical area, and testing a plurality of algorithms of the AV in the virtual environment in the physical area.

11. The method of claim 10, wherein the plurality of algorithms comprises localization and perception and object detection and decision making and path tracking and collision avoidance algorithms of the AV.

12. The method of claim 9, further comprising evaluating or developing the AV based on the testing in the virtual environment in the physical area.

13. The method of claim 7, further comprising collecting or analyzing data of the AV or algorithmic results of the AV responsive to the navigating or driving the AV through the at least one scenario in the physical area.

14. The method of claim 7, further comprising using a computational system configured to run in real time and keep track of actual motion of the AV with respect to a starting position and place a corresponding soft vehicle model in a correct relative position and pose in the realistic real world or representative 3D environment.

15. A system comprising a computational system and software that are configured to:

generate a virtual environment for a physical area that is a realistic real world or representative three-dimensional (3D) environment;

generate raw perception and localization sensor information from the realistic real world or representative 3D environment using soft sensors configured to obtain perception sensor information from the realistic real world or representative 3D environment, convert the perception sensor information to at least one raw or object data format expected by an autonomous driving computer of the AV, and physically send the converted perception sensor information to the autonomous driving computer while bypassing physical sensor connections in the AV;

feed the raw perception and localization and communication sensor information to an autonomous driving computer system in an autonomous vehicle (AV) that is operating in the physical area to navigate the representative 3D environment while a computational system runs in real time and keeps track of actual motion of the AV with respect to a starting position and places a corresponding soft vehicle model in a correct relative position and pose in the realistic real world or representative 3D environment, such that the autonomous driving system behaves as if the AV is in a realistic real world or representative 3D environment; and navigating the AV through in the physical area from within the virtual environment to test capabilities of the AV under the at least one scenario.

16. The system of claim 15, wherein the computational system is configured to run in real time and keep track of actual motion of the AV with respect to a starting position and place a corresponding soft vehicle model in a correct relative position and pose in the realistic real world or representative 3D environment.

\* \* \* \* \*